United States Patent [19]

Li et al.

[11] Patent Number: 4,673,552

[45] Date of Patent: Jun. 16, 1987

[54] DOWNWARDLY DIRECTED FLUID FLOW DISTRIBUTION SYSTEM FOR EBULLATED BED REACTOR

[75] Inventors: Allen S. Li, Morristown; Richard M. Eccles, Princeton; Lloyd M. Ruef, Clark, all of N.J.

[73] Assignee: Hydrocarbon Research, Inc., Lawrenceville, N.J.

[21] Appl. No.: 730,255

[22] Filed: May 3, 1985

Related U.S. Application Data

[63] Continuation of Ser. No. 416,429, Sep. 9, 1982, abandoned.

[51] Int. Cl.$^4$ .............................................. B01J 8/20
[52] U.S. Cl. ...................................... 422/140; 422/143; 422/145; 422/220; 422/311
[58] Field of Search ............... 422/140, 143, 145, 176, 422/220, 311

[56] References Cited

U.S. PATENT DOCUMENTS

| | | | |
|---|---|---|---|
| 2,559,876 | 7/1951 | Hoekiha | 422/145 |
| 2,862,798 | 12/1958 | McKinney | 422/145 X |
| 2,996,361 | 8/1961 | Brumbaugh | 422/20 |
| 3,414,386 | 12/1968 | Mattix | 422/140 X |
| 3,460,916 | 8/1969 | Aronsohn | 422/176 X |
| 3,523,763 | 8/1970 | Von Dresca et al. | 422/145 |
| 3,560,167 | 2/1971 | Bruckner et al. | 422/220 |
| 3,597,166 | 8/1971 | Hochman | 422/220 |
| 3,698,876 | 10/1972 | Gregoli et al. | 422/140 X |
| 4,221,653 | 9/1980 | Chervenak et al. | 422/140 X |
| 4,414,100 | 11/1983 | Krug et al. | 422/145 X |

FOREIGN PATENT DOCUMENTS

| | | | |
|---|---|---|---|
| 2758327 | 9/1978 | Fed. Rep. of Germany | 422/140 |
| 0036993 | 11/1979 | Japan | 422/220 |

*Primary Examiner*—Barry S. Richman
*Assistant Examiner*—William R. Johnson
*Attorney, Agent, or Firm*—Fred W. Wilson

[57] ABSTRACT

An improved flow distribution system for a catalytic reactor plenum chamber for a gas-liquid-solids ebullated bed reactor including a downwardly directed conduit and a flow distributor device such as a baffled nozzle attached to the inner end of the conduit, said nozzle containing at least two substantially parallel baffle plates usually oriented substantially normal to the nozzle inlet flow direction for providing initially downward flow and good mixing and radial flow dispersion of gas-liquid materials in the lower portion of the plenum. The initially downward flow is then deflected generally upwardly by the curved lower head of the reactor plenum chamber and passes uniformly upwardly through a flow distribution grid into the ebullated catalyst bed. A sparger can be provided in the plenum above the flow distributor device for feeding additional gas-liquid mixture into the reactor. Alternatively, the flow distribution system can include a conical-shaped flow deflector device having its base rigidly attached to the plenum lower wall and having its apex oriented toward and substantially aligned with the centerline of the inner end of the conduit. The flow distribution system provides substantially uniform flow dispersion of the gas-liquid mixture into the ebullated bed, and minimizes stagnant zones in the plenum and thereby provides fouling-free operation of the reactor.

15 Claims, 4 Drawing Figures

DOWNWARDLY DIRECTED FLUID FLOW DISTRIBUTION SYSTEM FOR EBULLATED BED REACTOR

This application is a continuation of application Ser. No. 416,429, filed 9/9/82, now abandoned.

BACKGROUND OF INVENTION

This invention pertains to a fluid flow distributor device and system for introducing feed and recycle fluid streams uniformly into a plenum and an ebullated catalyst bed of a reactor. It pertains particularly to such a flow distribution system for handling petroleum and coal-oil slurry and gas streams in which the flow is initially directed downwardly for substantially uniform mixing and flow distribution into an ebullated catalyst bed.

Experience in operating pilot plant and commercial reactors used in H-Oil ® and H-Coal ™ processes has shown that improper design of the inlet flow distribution in the reactor plenum can cause operational difficulties, such as coke formation in the plenum, flow maldistribution in the catalyst bed, localized catalyst bed slumping, and formation of coke in the bed. These problems have reduced catalyst utilization, and resulted in frequent reactor shutdowns and shortened periods of operation.

The prior art has apparently not provided an adequate solution to this flow distribution problem in fluidized bed catalytic reactors. For example, U.S. Pat. No. 3,197,288 to Johanson shows a catalytic reactor configuration using simple conduits for introducing the inlet feed and recycle liquid into the reactor plenum chamber, and U.S. Pat. No. 3,202,603 to Keith, et al, shows use of dual spargers in the lower end of a reactor. Also, U.S. Pat. No. 3,540,995 to Wolk, et al generally discloses operation of a coal hydrogenation process using an ebullated catalyst bed reactor in which feed and recycle liquid streams are introduced into the reactor lower end plenum below a flow distribution grid means. However, introducing such gas and liquid streams into a reactor plenum at high velocity requires more specific arrangements for the streams to achieve adequate mixing and uniform flow distribution. For this reason, improved designs of flow distributor devices to provide desirably uniform flow patterns in the reactor plenum have now been developed.

SUMMARY OF INVENTION

The present invention provides a fluid flow distributor device and flow distribution system for feeding hydrocarbon liquid or slurry and a gas uniformly into a plenum chamber and upwardly into an ebullated catalyst bed of a reactor which includes means defining a lower end below the ebulated bed and at least one side wall means. The invention comprises a flow distributor device for providing uniform flow distribution of a gas/liquid mixture into an ebullated bed of a reactor, the flow distributor device being located in a plenum of the reactor, said plenum being formed by a distribution grid and the lower end and lower walls of the reactor below the grid, the flow distributor device comprising a conduit extending into said plenum from outside the reactor with the conduit inner end being directed downwardly in the plenum, and a baffled nozzle positioned at the inner end of the conduit within the plenum and downwardly directed toward the lower walls of the reactor for recycling a hydrocarbon fluid at least partially derived from a reaction within the ebullated bed, said baffled nozzle having at least two substantially parallel baffles spaced apart from each other and rigidly attached to the inner end of said conduit, the innermost downstream baffle consisting of a solid plate, and at least one other upstream baffle having a central opening and located upstream of the solid plate downstream baffle, whereby said baffled nozzle mixes a gas and a liquid material fed through said conduit downwardly into said plenum, and is arranged in combination with said distribution grid to effect a substantially uniform mixing and flow distribution of the gas/liquid mixture upwardly into said ebullated bed of the reactor.

The invention also comprises a fluid flow distribution system for providing a uniform flow distribution of a fluid material into an ebullated catalyst bed of a reactor, the distribution system comprising a plenum provided in the lower part of the reactor and formed by the lower end and side walls and also by a distribution grid located below the ebullated bed in the reactor; a conduit extending into the plenum for carrying a flowable fluid material initially downwardly into the plenum; and a baffled nozzle flow distributor downwardly directed in the lower end of the plenum and associated in flow relationship with the baffled nozzle conduit, whereby the distributor mixes a gas and a liquid material fed through said conduit downwardly into said plenum and is so arranged in combination with the distribution grid to effect a substantially uniform mixing and flow distribution of the gas/liquid mixture upwardly into the ebullated bed of the reactor.

In another embodiment of the invention, the flow distribution system comprises a plenum provided in the lower part of the reactor and formed by the reactor lower end and side walls and also by a distribution grid located below the ebullated bed in the reactor; a conduit extending into said plenum for carrying a flowable fluid material initially downwardly into the plenum; and a conical-shaped flow deflector device located in the lower end of the plenum, said conical deflector having its base rigidly attached to the plenum lower end and having its apex oriented toward the inner end of the conduit, the centerline of the conical-shaped deflector being substantially aligned with the centerline of the inner end of the conduit, whereby said conical deflector mixes a gas and a liquid material fed through said conduit into said plenum and is arranged in combination with the distribution grid to effect a substantially uniform mixing and flow distribution of the gas/liquid mixture uniformly upwardly into the ebullated bed of the reactor.

This invention is particularly useful for handling hydrocarbon feedstreams such as petroleum and coal slurries for uniform distribution together with hydrogen gas into an ebullated catalyst bed reactor, particularly when the superficial velocity in the feed conduit exceeds about 8 ft/sec. Accordingly, the term gas/liquid mixture is understood to include also gas/liquid slurry mixtures containing fine particulate solids.

DESCRIPTION OF INVENTION

Figure 1:
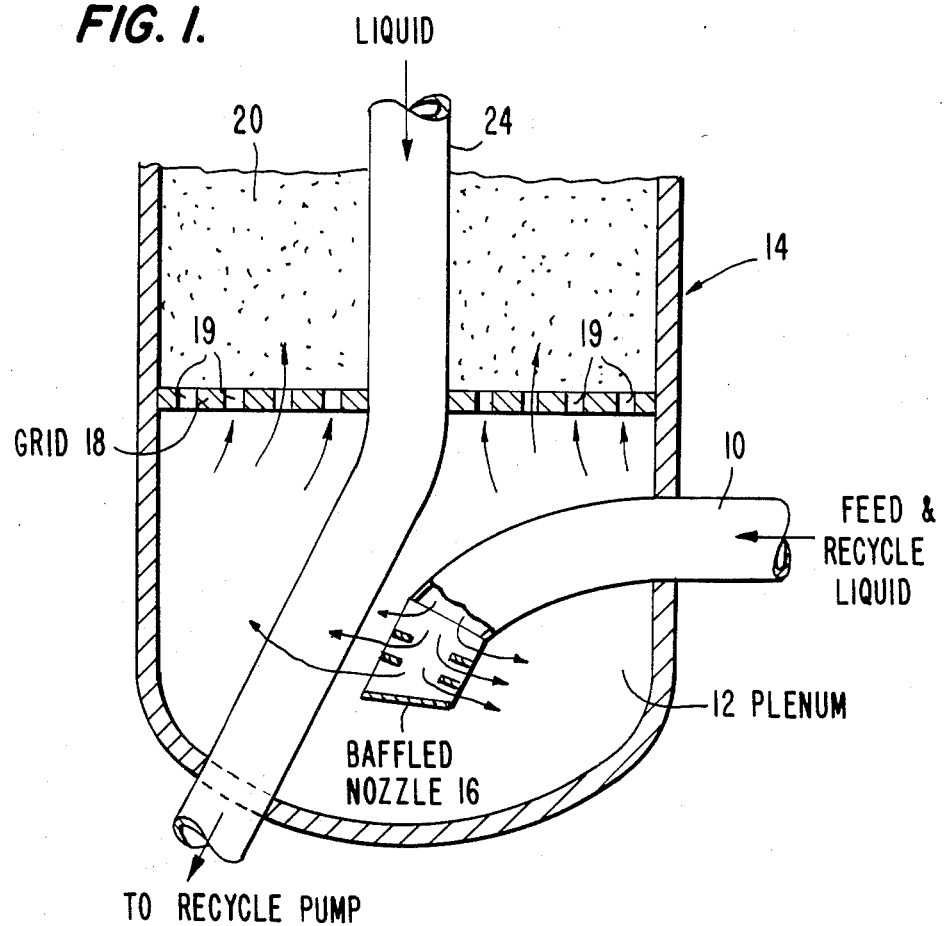
FIG. 1 is a vertical cross-sectional view of the lower portion of an ebullated bed reactor utilizing the invention and including a plenum and flow distributor device.

In the present invention, the fluid feed stream such as a mixture of coal-derived liquid slurry and hydrogen at 650°–950° F. temperature and 500–3000 psig pressure conditions is passed through a flow distributor device comprising a conduit and a flow distributor means such as a disc-donut type baffled nozzle into a plenum located at the lower end of a reactor. The inner end of the conduit is downwardly-directed and the flow distributor means is positioned at the inner end of the conduit within the plenum and is also downwardly directed toward the lower wall of the reactor. The center line of the conduit entering the plenum is arranged at an angle of 45°–90° with the vertical center line of the plenum and reactor. The flow distributor usually contains a series of substantially parallel spaced-apart baffle plates located at an angle of 45°–90° to the centerline of conduit inner end, which distributor provides lateral or radially outward flow deflection within the plenum. The inlet flow distributor device for the reactor plenum of gas-liquid-solids fluidized bed reactors provides a fouling-free flow distribution for dispersion of the kinetic energy in the flowing fluids fed into the reactor plenum chamber. The distributor device prevents "jetting" of the recycle liquid and gas stream in the plenum, and disperses the liquid flow uniformly in the plenum.

Depending on the reactor operating conditions and the space available in the plenum, the flow distributor nozzle can have various configurations. The liquid flow distributor nozzle can consist of at least two preferably circular baffle plates located at the outlet of the recycle liquid conduit. For a central vertical baffled nozzle location within the plenum, these baffle plates are usually equally spaced from each other. The nozzle innermost downstream plate is solid, and deflects the inlet flow laterally to prevent direct impingement of liquid on the bottom of the plenum. The other upstream baffle (s) or dispersion plates in the nozzle have central openings sized to intercept and deflect portions of the liquid flow laterally or radially outwardly into the plenum. The flow paths of these lateral streams are directed to sweep the plenum bottom to eliminate stagnation zones and provide good mixing of gas/liquid/solids (or gas/liquid slurry) and substantially uniform flow distribution upwardly through openings in the flow distribution grid into the ebullated bed.

The percent of total material flowing radially outwardly from the space between each baffle plate can be varied by selecting the dimensions of the distributor nozzle. For example, in a deflector nozzle design having three baffle plates, about 40–45% of the inlet liquid flow is deflected by the first upstream baffle plate, 25–35% is deflected by the middle or intermediate baffle plate, and the remaining flow is deflected radially outwardly by the bottom or downstream baffle plate. For a conduit and nozzle configuration entering the plenum from one side and not located on the plenum vertical centerline, the baffle plates are oriented at an angle varying from about 0° to about 10° with the adjacent baffle, to provide uniform mixing and dispersion of the gas/liquid flow within the plenum.

The spaced-apart baffles are oriented at an angle of 45°–90° with the center line of the inner end of the conduit. In the flow distributor nozzle, the upstream plate has a central opening having a diameter of 0.6–0.75 times the conduit inner diameter and the intermediate plate has a central opening having a diameter of 0.4–0.5 times the conduit inner diameter. Also, the baffle plates are spaced apart by a distance equal to 0.3–0.5 times the conduit inner diameter.

From small diameter reactors having inside diameters less than about 5 feet, it is usually more convenient to mix the feed liquid and gas streams with the reactor recycle liquid external to the reactor prior to uniformly distributing the combined mixture in the reactor plenum, utilizing the distributor device of FIG. 1 as described below. For reactors having diameters larger than about 6 ft., it is usually desirable to introduce the feed liquid and gas mixture into the reactor plenum through separate distributor devices. For example, a circular perforated sparger ring is usually located in the plenum upper portion and can be used to distribute the gas-liquid feed mixture uniformly across the reactor plenum. Uniform flow of small bubbles and liquid feed is produced by providing a pressure drop across the sparger and directing the mixed gas-liquid streams from the sparger downwardly to substantially dissipate the stream kinetic energy in the liquid. This kinetic energy is utilized to increase the intensity of liquid backmixing in the plenum. Pressure drops across the sparger ring openings usually range from 1–15 psi for typical heavy petroleum crude upgrading and coal liquefaction processes.

In an alternative embodiment of the invention, the flow distributor device consists of a conduit and a conical-shaped deflector having its base rigidly attached to the plenum lower all and having its apex oriented toward and substantially aligned with the centerline of the inner end of the conduit. This inlet flow distributor device is used upstream and in combination with the reactor flow distribution grid to provide an improved flow distribution system for an ebullated bed catalyst reactor. The pressure drop across the baffled nozzle distributor device at rated flow is usually 5–25% of the total pressure drop across both the distributor device and the distribution gride. Although the distribution grid can consist of a perforated plate, it preferably contains multiple vertical tubes each provided with a cap over the the upper end. This distribution system provides improved gas-liquid contacting and gas mixing in the reactor plenum, eliminates undesired direct impingement of the fluid streams on the distribution grid, and minimizes coke formation in the plenum and in the catalyst bed supported above the grid.

The invention will be further described with reference to FIG. 1, which shows an inlet conduit 10 inserted into a plenum chamber 12 of reactor 14. The conduit has a baffled nozzle or disc-donut type flow distributor 16 oriented generally downwardly in the plenum for feeding a liquid and gas mixture into the plenum, then passing the mixture uniformly upwardly through openings 19 in flow distribution grid 18 into ebullated catalyst bed 20. Reactor liquid is withdrawn from above the catalyst bed downward through central conduit 24 to a recycle pump (not shown), from which the liquid is recycled together with fresh liquid and gas feed through inlet conduit 10 to flow distributor 16. The plenum 12 preferably has a height equal to 5-10 times the inner diameter conduit 10, and distribution grid 18 preferably has a diameter equal to 4-12 times the inner diameter of conduit 10.

Figure 2:
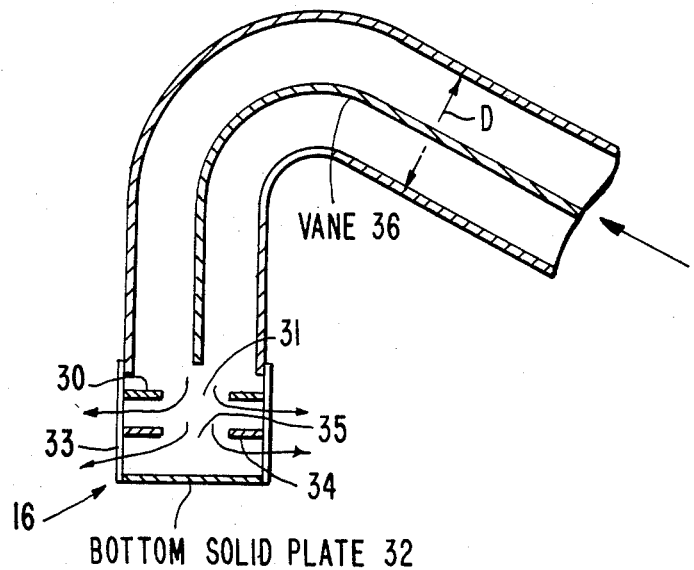
FIG. 2 is a vertical cross-sectional detail view of a baffled nozzle flow distributor used in the invention.

As shown in greater detail in FIG. 2, flow distributor nozzle 16 comprises at least one annular-shaped plate 30 having central opening 31 located upstream of bottom circular solid plate 32, and all retained together by three circumferentially equally-spaced structural rods 33, which are preferably located at the baffle plate outer edges. Usually an additional annular-shaped plate 34, having progressively smaller central opening 35, can be located intermediate plates 30 and 32 to provide a preferred baffled nozzle configuration for further radial distribution of the flow from conduit 10. The greater percentage of flow should preferably be emitted from the lowest downstream space, because of the greater distance of fluid travel in plenum 12 before reaching distribution grid 18. For a flow distributor nozzle 16 having three plates, the plate dimensions are preferably selected such that about 40-45 volume percent of the fluid flow is deflected radially outwardly by bottom solid innermost downstream baffle 32, about 25-35 volume percent is deflected outwardly by the second or intermediate baffle 34, and the remaining flow radially deflected by top or upstream plate 30. If desired, at least one flow straightening vane 36 can be centrally oriented longitudinally inside conduit 10, so that the flow pattern reaching the distributor device 16 is substantially undirectional. Such flow straightening vane is particularly useful when the angle of deflection for the flowing fluid in conduit 10 exceeds about 30°.

Figure 3:
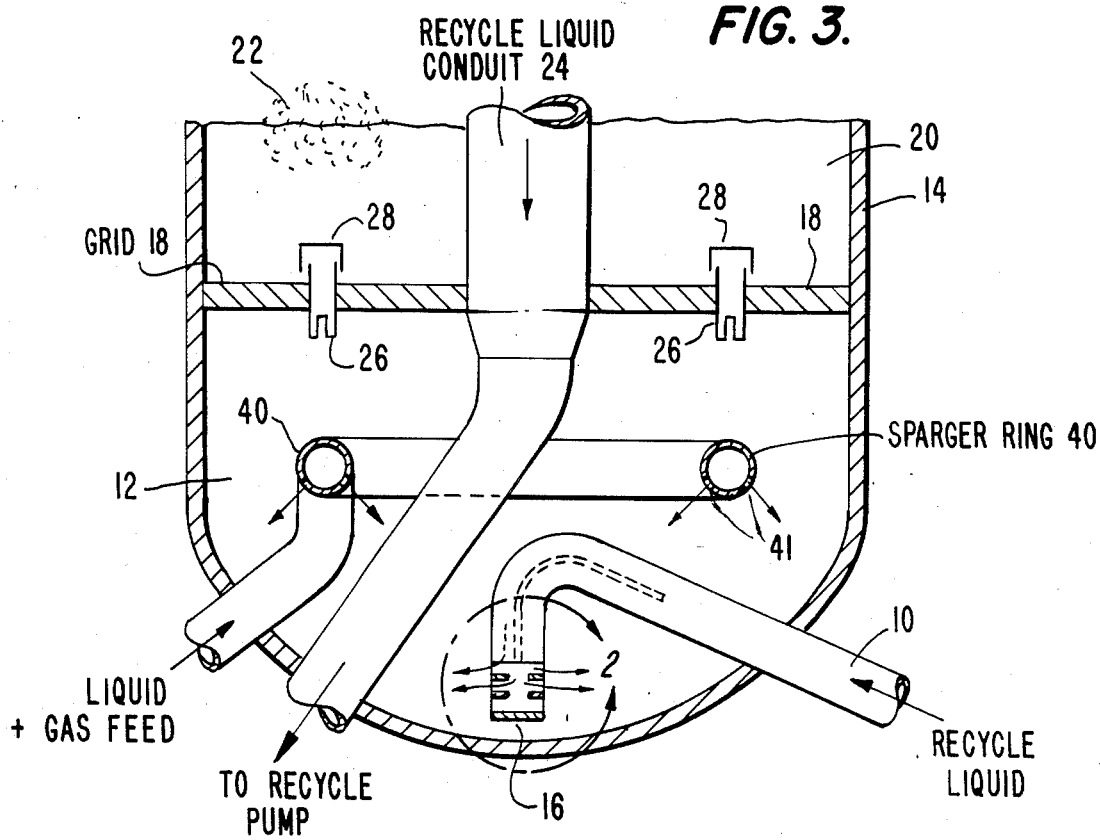
FIG. 3 shows a vertical cross-sectional view of an alternative embodiment of the invention in which feed and recycle streams are introduced into the plenum through separate flow devices.

FIG. 3 shows an alternative configuration for the fluid flow distribution system of this invention, wherein the flow distributor nozzle 16 is centrally located on the longitudinal centerline of the plenum and downwardly oriented in the bottom part of plenum chamber 12 below distribution grid 18, and is located above the bottom of the reactor poenum by a distance equal to 1.0-2.0 times the inside diameter of the inlet conduit. The flow distribution grid 18 preferably contains multiple verticle tubes 26 having inner diameter of 0.75-1.5 inches and which extend below the grid by a distance equal to 4-10 times the tube inner diameter. Tubes 26 extend above the grid by a distance equal to about 1.5-4 times the tube inner diameter. Above the upper end of each tube 26, a cylindrical-shaped cap 28 is provided, which is spaced away from the tube and is rigidly supported from the tube by suitable structural members (not shown). Cap 28 is oriented so as to prevent entry of catalyst solid particles 22 from the ebullated bed into tubes 26 whenever there is no upward fluid flow through the tube, such as may occur during operational upsets or occurs at process shutdown.

A circular or annulus shaped sparger ring 40 having uniformly spaced openings 41 on its lower side is provided above flow distributor device 16 to uniformly distribute gas and liquid flow in the upper portion 12a of the plenum chamber. The sparger ring 40 encircles downcomer conduit 24 and is particularly useful for large diameter reactors, such as exceeding about 8 feet inside diameter. Multiple spaced openings 41 in sparger ring 40 are sized to provide a uniform pressure drop and are located to direct the flow downwardly so as to substantially dissipate its kinetic energy and increase the back-mixing action of gas and liquid in the plenum 12.

Figure 4:
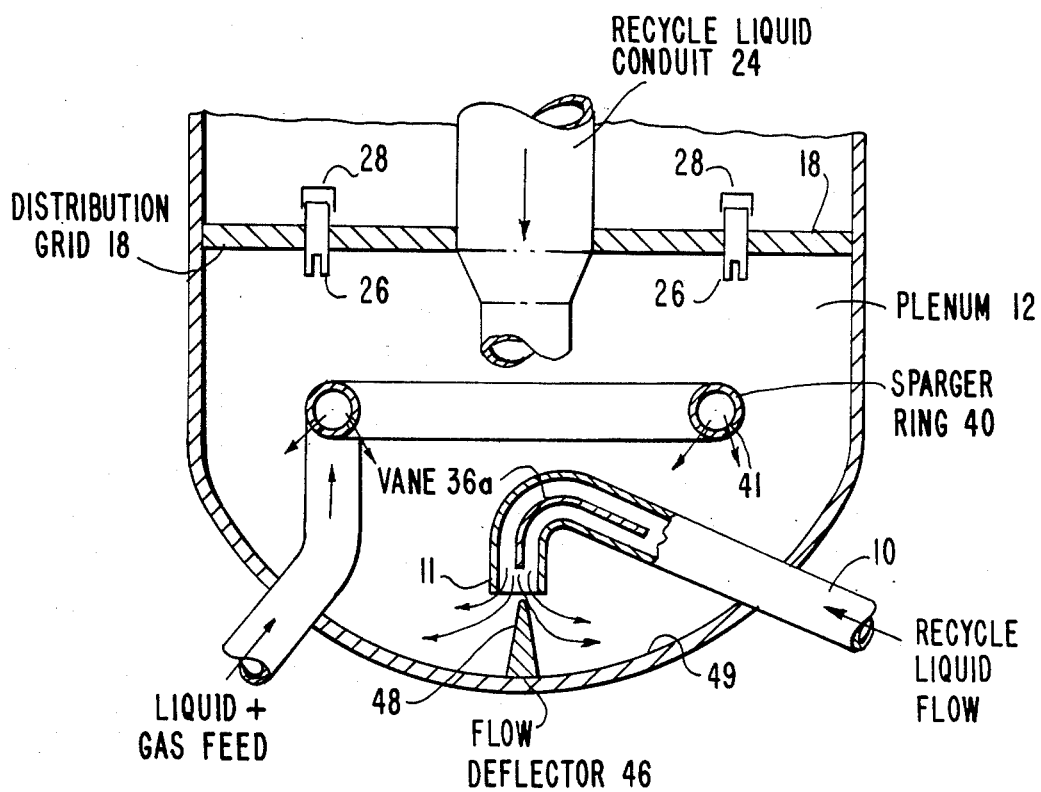
FIG. 4 shows another embodiment of the invention similar to FIG. 3 but utilizing a centrally-located conical-shaped deflector device.

In another embodiment of the invention as shown by FIG. 4, the flow distributor device consists of a conduit and a conical-shaped deflector 46 which is centrally-located within the bottom portion of the plenum 12, and has its base rigidly attached to the plenum bottom wall 49. The apex 48 of the deflector 46 is centrally aligned with downwardly oriented end 11 of inlet conduit 10, so that the flow from conduit 10 is deflected substantially uniformly radially outwardly against the lower walls 49 of the plenum 12. The conical surface of deflector 46 can be made straight, or curved outwardly at the lower end to facilitate a gradual outward deflection of the flow of the gas/liquid mixture in the plenum. Thus, flow deflector device 46 operates similarly as for distributor nozzle 16, whereby the total flow passes radially outwardly and against the walls of the plenum. Circular sparger ring 40 is provided in plenum chamber 12 centrally located above flow distribution device 46, similarly as for the FIG. 3 configuration.

The effectiveness of using the inlet flow distributor device configuration is illustrated by the following examples, which should not be regarded as limiting the scope of the invention.

EXAMPLES

In a coal hydrogenation plant using the H-Coal ™ Process for coal liquefaction and having an ebullated bed catalyst reactor with 5 ft. inside diameter, (200 tons/day Catlettsburg H-Coal Pilot Plant Reactor), the feed coal slurry and gas is mixed with the recycle ebullation liquid flow external to the reactor. The total combined stream is then distributed through a side-entering downwardly directed baffled nozzle equipped with three inclined baffle plates, as generally described in the FIG. 1 embodiment of this invention. Following installation of the flow distributor nozzle in the plenum, coking in the reactor ebullated catalyst bed due to flow maldistribution therein is substantially eliminated.

In a commercial H-Coal (18,000 tons/day) Plant reactor design having an 11 ft. inside diameter, the inlet flow distribution system in the plenum contains a side-entering downwardly directed baffled nozzle equipped with three inclined baffle plates for dispersion of the recycle liquid slurry flow and a circular sparger ring located above the nozzle for distributing the feed liquid slurry liquid and gas. In a commercial H-Oil ® (35,000 bbl/day) Plant reactor design, having 10 ft. inside diameter, the inlet flow distribution system in the reactor plenum consists of a centrally-located vertically-oriented baffled nozzle equipped with three horizontal plates for dispersion of the recycle ebullating liquid flow, and a sparger ring located above the nozzle for uniform flow distribution of the feedstream liquid and gas.

Although this invention has been described broadly and in terms of various specific embodiments, it will be understood that modifications and variations can be made and some elements used without others all within the spirit and scope of the invention, which is defind by the following claims.

We claim:

1. In a reactor containing an ebullated bed, with the reactor further comprising means defining a lower end and at least one side wall means wherein the improvement comprises a fluid flow distribution system for providing a uniform flow distribution of a fluid material mixture upwardly into the ebullated bed of the reactor comprising:

(a) a plenum provided in a lower part of the reactor and defined by the lower end and the at least one side wall of the reactor and also by a distribution grid located below and supporting the ebullated bed in the reactor, said distribution grid having a plurality of vertical tubes extending therethrough, wherein each of said vertical tubes have an upper end which is covered by a cap and a lower end which extends below the distribution grid into the plenum;

(b) a conduit extending through said at least one side wall downwardly into said plenum for carrying a flowable fluid material initially downwardly into the plenum; and (c) a baffled nozzle located in a lower end of said plenum and rigidly attached in flow relationship with said conduit, said baffled nozzle being downwardly directed in the plenum and located below said distribution grid by a distance equal to 3-9 times the inner diameter of said conduit, said baffled nozzle having at least two baffles spaced apart from each other, including a first upstream baffle plate having means defining a central opening therein, and a second downstream baffle plate consisting of a solid plate, whereby said baffled nozzle mixes a gas and a liquid material fed through said conduit into said plenum and is so arranged and located in combination with said distribution grid to effect a substantially uniform mixing and flow distribution of the gas/liquid mixture upwardly into said ebullated bed.

2. The reactor of claim 1 wherein said conduit has an angle of deflection for a fluid flowing therein exceeding about 30° and contains at least one flow straightening vane located within said conduit at a location upstream of said baffled nozzle.

3. The reactor of claim 1, wherein said spaced-apart baffles are oriented at an angle of 45°-90° with respect to the centerline of said conduit.

4. The reactor of claim 1, wherein said baffled nozzle is centrally located on the longitudinal centerline of said plenum, and above the lower end by a distance equal to 1.0-2.0 times the inside diameter of said conduit, with the centerline of said conduit entering the plenum being at an angle of 45°-90° with the longitudinal centerline of said plenum.

5. The reactor of claim 1, wherein said baffle plates are spaced apart by a distance equal to 0.3-0.5 times the inner diameter of the conduit.

6. The reactor of claim 1, wherein the fluid pressure drop across the baffled nozzle is 5-25% of the total fluid pressure drop across the baffled nozzle and said distribution grid.

7. The reactor of claim 1, wherein an annulus-shaped sparger is provided in said plenum below said distribution grid and above said baffled nozzle.

8. The reactor of claim 1, wherein the plurality of vertical tubes of the distribution grid each have an inner diameter of 0.75-1.5 inches and extend below the grid by a distance equal to 4-10 times the tube inner diameter and extend above the grid by a distance equal to about 1.5-4.0 times the tube inner diameter.

9. The reactor of claim 1, wherein said baffled nozzle consists of three circular baffle plates, including said first baffle plate, a third intermediate baffle plate having a central opening smaller than the opening in said first upstream plate, and said second downstream baffle plate.

10. The reactor of claim 9, wherein said central opening of said first upstream baffle has a diameter of 0.6-0.75 times the inner diameter of the conduit, and said third intermediate baffle plate central opening has a diameter of 0.4-0.5 times the inner diameter of the conduit.

11. In a reactor containing an ebullated bed, with the reactor further comprising means defining a lower end and at least one side wall means wherein the improvement comprises a fluid distribution system for providing a uniform flow distribution of a fluid material mixture upwardly into the ebullated bed comprising:

(a) a plenum provided in a lower part of the reactor and defined by the lower end and the at least one side wall and also by a distribution grid located below and supporting the ebullated bed in the reactor, said distribution grid having a plurality of vertical tubes extending therethrough, wherein each of said vertical tubes have an upper end which is covered by a cap and a lower end which extends below the distribution grid into the plenum;

(b) a conduit having an inner end which extends through said at least one side wall downwardly into said plenum for carrying a flowable fluid material initially downwardly into the plenum, said conduit containing at least one flow straightening vane longitudinally oriented therein;

(c) a baffled nozzle rigidly attached to the inner end of said conduit, said baffled nozzle being located within said plenum and below said distribution grid by a distance equal to 3-9 times said conduit inner diameter and having three substantially parallel baffles spaced apart from each other, a first downstream baffle consisting of a solid plate, a third upstream baffle having means defining a central opening therein and located upstream of the first baffle, and a second intermediate upstream baffle having means defining a central opening smaller than that in said third upstream baffle; and (d) a sparger ring located within said plenum below said distribution grid and above said baffled nozzle, whereby said baffled nozzle and said sparger mix gas and liquid materials fed through said conduit and through said sparger into said plenum and are arranged and located in combination with said distribution grid to effect a substantially uniform mixing and flow distribution of the gas/liquid mixture uniformly upwardly into said ebullated bed.

12. The reactor of claim 11, wherein the spaced-apart baffles are oriented at an angle of 45°-90° with respect to the longitudinal axis of the inner end of said conduit.

13. The reactor of claim 11, wherein said baffled nozzle is centrally located in said plenum with the axis of said conduit entering into said plenum being at an angle of 45°-90° with respect to the longitudinal centerline of said plenum and reactor.

14. The reactor of claim 11, wherein said third upstream baffle plate central opening has a diameter of 0.6-0.75 times the conduit inner diameter, and said second intermediate baffle plate central opening has a diameter 0.4-0.5 times the conduit inner diameter.

15. The reactor of claim 11, wherein said baffle plates are spaced apart by a distance equal to 0.3-0.5 times the conduit inner diameter.

* * * * *